(12) United States Patent
D'Orazio et al.

(10) Patent No.: US 12,704,401 B2
(45) Date of Patent: Aug. 11, 2026

(54) DIRECTIONAL BLAST GAUGE SYSTEM AND METHOD

(71) Applicant: BlackBox Biometrics, Inc., Rochester, NY (US)

(72) Inventors: Angela D'Orazio, Rochester, NY (US); Bradford Laundry, Rochester, NY (US); Philip Moise, Rochester, NY (US)

(73) Assignee: BlackBox Biometrics, Inc., Rochester, NY (US)

( * ) Notice: Subject to any disclaimer, the term of this patent is extended or adjusted under 35 U.S.C. 154(b) by 323 days.

(21) Appl. No.: 18/618,318

(22) Filed: Mar. 27, 2024

(65) Prior Publication Data

US 2024/0328848 A1 Oct. 3, 2024

Related U.S. Application Data

(60) Provisional application No. 63/456,052, filed on Mar. 31, 2023.

(51) Int. Cl.
*G01H 3/12* (2006.01)
*G01H 5/00* (2006.01)
(Continued)

(52) U.S. Cl.
CPC ................ *G01H 3/12* (2013.01); *G01H 5/00* (2013.01); *G01L 5/0052* (2013.01); *G01L 5/14* (2013.01);
(Continued)

(58) Field of Classification Search
CPC .......... G01H 3/12; G01H 5/00; G01L 5/0052; G01L 5/14; G01L 5/16; G01L 19/0092; G01L 23/08
See application file for complete search history.

(56) References Cited

U.S. PATENT DOCUMENTS 5,241,518 A * 8/1993 McNelis .................. G01S 5/18 367/906
5,435,178 A * 7/1995 Edwards ............ G01L 19/0007 73/170.15
(Continued)

FOREIGN PATENT DOCUMENTS

GB 2318872 A * 5/1998 .......... G01S 3/8083
WO 2022272095 12/2022
(Continued)

OTHER PUBLICATIONS

GB-2318872-A, English Translation (Year: 1998).*
(Continued)

*Primary Examiner* — Ryan D Walsh
(74) *Attorney, Agent, or Firm* — Nelson Mullins Riley & Scarborough LLP

(57) ABSTRACT

Systems and methods for a directional blast gauge including a plurality of blast sensors are disclosed, including a first blast sensor having a first power consumption metric when in operation and two or more second blast sensors having a second power consumption metric lower than the first power consumption metric, wherein positions of the first blast sensor and the two or more second blast sensors define a first plane, and a control circuit configured to measure a blast overpressure waveform of an event using the first blast sensor and to determine time differential data of the event using the two or more second blast sensors.

20 Claims, 3 Drawing Sheets

(51) Int. Cl.

| | |
|---|---|
| ***G01L 5/00*** | (2006.01) |
| ***G01L 5/14*** | (2006.01) |
| ***G01L 5/16*** | (2020.01) |
| ***G01L 19/00*** | (2006.01) |
| ***G01L 23/08*** | (2006.01) |

(52) U.S. Cl.

CPC ............ *G01L 5/16* (2013.01); *G01L 19/0092* (2013.01); *G01L 23/08* (2013.01)

(56) References Cited

U.S. PATENT DOCUMENTS

| | | | | |
|---|---|---|---|---|
| 6,178,141 | B1 * | 1/2001 | Duckworth | G01S 3/8083 367/906 |
| 8,005,631 | B2 * | 8/2011 | Barger | G01S 5/22 702/66 |
| 9,138,172 | B2 | 9/2015 | Borkholder et al. | |
| 11,668,614 | B2 * | 6/2023 | Willens | G01L 19/147 73/756 |
| 12,190,695 | B2 * | 1/2025 | McGrath | G01H 3/10 |
| 2005/0109075 | A1 * | 5/2005 | Kithil | G01L 5/0052 73/12.09 |
| 2012/0239343 | A1 * | 9/2012 | Borkholder | A42B 3/046 702/139 |
| 2015/0143875 | A1 * | 5/2015 | Wong | G01L 23/00 73/35.14 |
| 2016/0097756 | A1 | 4/2016 | Borkholder et al. | |
| 2020/0303081 | A1 * | 9/2020 | Przekwas | G16H 15/00 |
| 2020/0340873 | A1 * | 10/2020 | Jenkins | G01L 5/14 |
| 2020/0386639 | A1 * | 12/2020 | Jenkins | G01L 5/14 |
| 2023/0047652 | A1 | 2/2023 | Willens et al. | |
| 2023/0070560 | A1 | 3/2023 | D'orazio et al. | |
| 2023/0370758 | A1 | 11/2023 | D'orazio et al. | |
| 2023/0408325 | A1 * | 12/2023 | Wiri | G01S 5/20 |
| 2024/0337549 | A1 * | 10/2024 | Baier | G01H 3/14 |
| 2025/0137836 | A1 * | 5/2025 | Mulligan | G01L 5/14 |

FOREIGN PATENT DOCUMENTS

| | | | | |
|---|---|---|---|---|
| WO | 2022272099 | | 12/2022 | |
| WO | WO-2024180171 | A1 * | 9/2024 | G01L 1/142 |

OTHER PUBLICATIONS

WO-2024180171-A1, English Translation (Year: 2024).*

Borkholder, D. A., "Concept to commercialization of a MEMS-based blast dosimetry system", In 2015 Transducers—2015 18th International Conference on Solid-State Sensors, Actuators and Microsystems (Transducers) pp. 281-286 IEEE, (2015), 6 pgs.

Kamimori, G. H., "Occupational overpressure exposure of breachers and military personnel", Shock Waves 27(6) pp. 837-847, (2017), 11 pgs.

Wiri, "Reconstruction of improvised explosive device blast loading to personnel in the open", Shock Waves 26(3) 279-286, (2016), 8 pgs.

Wiri, S, "Computational modeling of blast exposure associated with recoilless weapons combat training", Shock Waves 27 (6) pp. 849-862, (2017), 14 pgs.

* cited by examiner

| TRUTH (DEG) | $\theta$ (DEG) $(d = 1")$ | $\theta$ (DEG) $(d = 1")$ |
|---|---|---|
| 23 | 18.4 | 242.4 |
| 43 | 45.0 | 45.0 |
| 48 | 51.3 | 50.2 |
| 68 | 74.3 | 68.8 |
| 91 | 101.8 | 92.0 |
| 110 | 123.0 | 110.9 |
| 125 | 137.3 | 125.1 |
| 140 | 152.1 | 140.1 |

| SHOCK FRONT SPEED (FT/S) | ANGLE RESOLUTION (DEGREES) | SENSOR OFFSET (INCHES) | SAMPLE RESOLUTION (US) | SAMPLE CLOCK FREQUENCY (HZ) |
|---|---|---|---|---|
| 2000 | 0 | 1 | | |
| 2000 | 5 | 1 | 0.160 | 6,282,990 |
| 2000 | 10 | 1 | 0.643 | 1,555,753 |
| 2000 | 15 | 1 | 1.167 | 680,346 |
| 2000 | 0 | 0.5 | | |
| | 5 | 0.5 | 0.080 | 12,565,979 |
| | 10 | 0.5 | 0.321 | 3,111,506 |
| | 15 | 0.5 | 0.735 | 1,360,692 |

DIRECTIONAL BLAST GAUGE SYSTEM AND METHOD

CLAIM OF PRIORITY

This patent application claims the benefit of priority, under 35 U.S.C. § 119 (e), to U.S. Provisional Patent Application Ser. No. 63/456,052, entitled "DIRECTIONAL BLAST GAUGE SYSTEM AND METHOD," filed on Mar. 31, 2023, which is hereby incorporated by reference herein in its entirety.

TECHNICAL FIELD

This document relates generally to detecting exposure of blast events, and more particularly, but not by way of limitation, to a blast probe with an ability to detect blast direction.

BACKGROUND

Unwanted or excessive sound can have deleterious effects on human health. Sounds having sound pressure levels (SPLs) above 85 decibels (dB) for extended periods of time can damage structures of the inner ear, leading to noise-induced hearing loss (NIHL). The Occupational Safety and Health Administration (OSHA) requires the employers implement hearing conservation programs when noise exposure is at or above 85 decibels averaged over 8 working hours, or an 8-hour time-weighted average (TWA). Exposure to sound events at more than 105 dB average (dBA) can cause some amount of permanent hearing loss.

Exposure to impulse events, such as blast exposure, can produce high intensity overexposures, often referred to as blast overpressure (BOP), which can pose both a risk of NIHL and a risk of traumatic brain injury (TBI) with one or more cumulative exposures. Impulse events include impulse noise events, such as gunshots, explosions, or other sound events having fast initial rise times, such as 50 us or less (e.g., frequencies of 20 kHz or higher), often with SPLs above 140 dB (depending on distance from the event).

Blast sensors include one or more stationary or ambulatory sensors (e.g., each including one or more pressure, acoustic, or other sensing element) configured to detect and monitor exposure to impulse noise or shock wave events ("events" as discussed herein). Blast sensors can be worn by a person to monitor impulse noise or shock wave event exposure of the person or attached to one or more objects (e.g., protective equipment, accessories, stationary objects, vehicles, etc.) to monitor impulse noise or shock wave event exposure to people or associated with or near the one or more objects. Common measurements for an event include peak overpressure, the maximum force experienced for the event, as well as overpressure impulse, the total (e.g., time integrated) force experienced for the event, and such forces experienced depend at least in part on orientation of the sensor to the event, whether parallel to (e.g., incident), perpendicular with (e.g., reflected), or combinations thereof.

A wearable blast gauge is essential for assessing risk of mild Traumatic Brain Injury (mTBI), Traumatic Brain Injury (TBI), and latent subconcussive neurological effects on troops using explosive weapons in training and engaged in combat. Today, service members with regular exposures to likely injurious levels of blast do not receive any documentation of their blast exposure, making it virtually impossible to estimate risk of injury, whether acute or latent. Wearable blast gauges fill that critical medical gap by providing personalized, objective data on every blast exposure to medics, leaders, clinicians, and researchers. Improved devices and methods are desired to better assess a wearer's exposure to blasts.

SUMMARY

A blast gauge and associated methods are disclosed. The blast gauge includes a plurality of blast sensors. The plurality of blast sensors includes a first blast sensor having a first power consumption metric when in operation. The plurality of blast sensors includes two or more second blast sensors having a second power consumption metric lower than the first blast sensor. Positions of the first blast sensor and the two or more second blast sensors define a first plane. The blast gauge includes a control circuit configured to measure a blast overpressure waveform of an event using the first blast sensor and to determine time differential data of the event using the two or more second blast sensors.

This summary is intended to provide an overview of subject matter of the present patent application. It is not intended to provide an exclusive or exhaustive explanation of the disclosure. The detailed description is included to provide further information about the present patent application. Other aspects of the disclosure will be apparent to persons skilled in the art upon reading and understanding the following detailed description and viewing the drawings that form a part thereof, each of which are not to be taken in a limiting sense.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figures 1, 2:
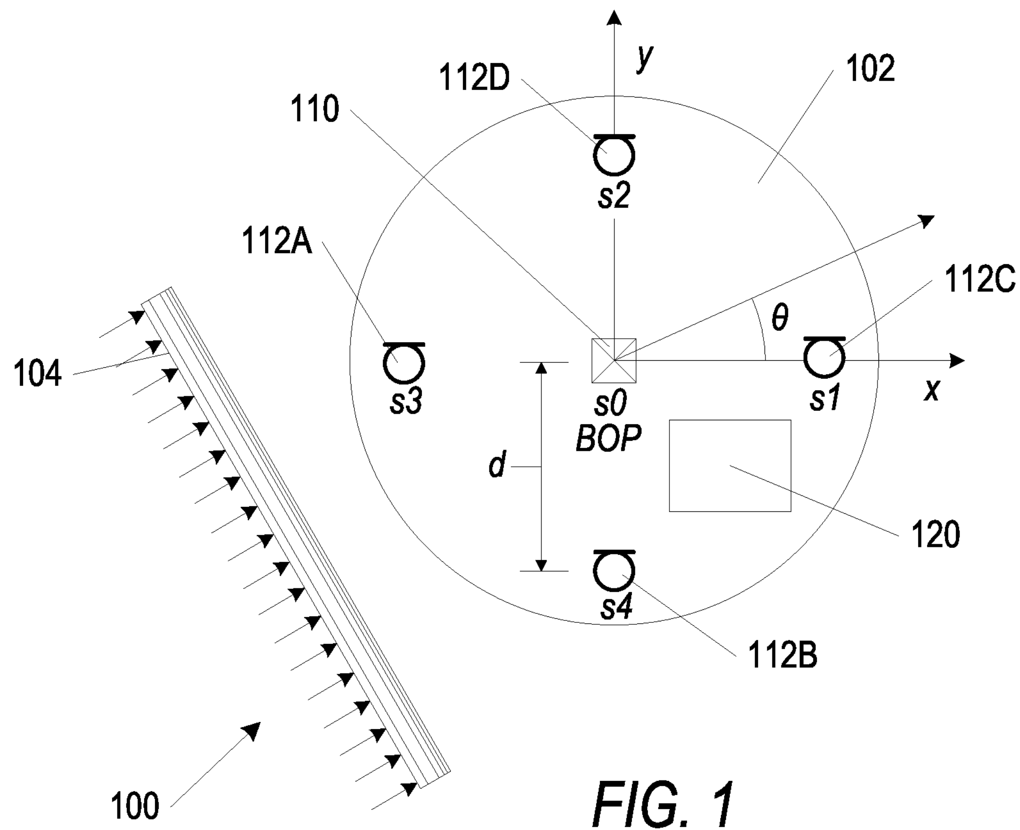
FIG. 1 illustrates a blast gauge according to selected examples.
FIG. 2 illustrates blast gauge data according to selected examples.

A wearable blast gauge is essential for assessing risk of mild Traumatic Brain Injury (mTBI), Traumatic Brain Injury (TBI), and latent subconcussive neurological effects on troops using explosive weapons in training and engaged in combat. Today, servicemembers with regular exposures to likely injurious levels of blast do not receive any documentation of their blast exposure, making it virtually impossible to estimate risk of injury, whether acute or latent. Wearable blast gauges fill that critical medical gap by providing personalized, objective data on every blast exposure to medics, leaders, clinicians, and researchers. However, data from any sensor must be understood in order to be applied effectively.

Placing separate sensors on multiple regions of the body (e.g., Head, Shoulder, Chest) is desirable to avoid shielding (e.g., when a firer lays in the common prone position, a chest-only gauge is completely covered). Any body-worn sensor inherently measures "body load," or the actual pressure experienced at that position on the body. Fast Automated Signal Transformation-Combat Training Software (FAST-CT) calculates the equivalent incident pressure based on two or more measurements from spatially separated blast gauges on the body. Currently, the medical community has not established a standard for correlating body-worn pressure measurements with injury risk. The systems and methods described herein can, in certain examples, provide both body-loaded pressure data (direct sensor measurements) as well as FAST-CT compatibility to support the warfighter.

In complex environments, such as an urban battlefield or training next to vehicles, knowing the direction of an incoming shockwave as it strikes the body can add further insights, both in a medical and operational context. Medically, knowing direction may allow for better injury risk estimation if it's found that mTBI and TBI are dependent on where the blast first interacts with the brain. The additional data may also improve the accuracy of future iterations of FAST-CT, supporting better correlation to injury guidelines based on incident blast overpressure (BOP). Operationally, knowing the direction an explosion originated from may allow for better learnings and adjustments in training, and the ability to react faster and more appropriately to incoming blasts in combat scenarios.

The present inventors have recognized, among other things, a direction-independent wearable Omni-Blast Gauge System (Omni-BGS) and corresponding method that measures the shock front velocity in addition to body-loaded pressure data. Multiple time-synced sensors (one higher fidelity with supporting lower-power surrogate sensors) encased within a single durable device housing, offset at sufficient distance, can precisely measure the relative time of arrival of the shock front between each sensor. Received data can be processed to report, among others, one or more of calibrated full waveform data, body-loaded Peak BOP and Impulse, shockwave velocity as well as metrics derived from advanced algorithms including peak incident BOP, peak incident impulse, and derived reflective pressure. Using lower-power surrogate sensors (e.g., ultra-low power surrogate sensors) can increase system efficiency and improve battery life while still delivering both magnitude and angle of incidence parameters. All parameters can be sent (e.g., automatically) via secure server to any desired online location (e.g., Smartabase, DOEHRS, etc.).

The BOP signatures can be used in real time to instantly classify and calculate summary statistics for storage with the full waveform data, in addition to feeding advanced algorithms such as a "Real/Not Real" false positive filter, automatic Weapons Classification tool, and FAST-CT.

A direction-independent blast gauge is shown using body worn, time-synced, spatially displaced sensors in a single form factor to detect shockwave velocity, including angle of incidence and speed for direction-independence and allowing for improved use of FAST-CT to calculate highly accurate peak reflective and incident values.

The present inventors have recognized, among other things, systems and methods to use multiple, disparate sensors housed in a single wearable gauge to capture BOP full waveform data, as well as BOP angle of incidence and shock front velocity using a first primary blast gauge sensor and two or more surrogate sensors at known offsets from the primary sensor. The disparate sensors are configured to measure relative time of arrival of the shock front over the surface of the blast gauge system. The differences in time of arrival of the signature can be used to derive the source direction of the shock front.

FIG. 1 shows a blast gauge system 100. A housing 102 holds a first blast sensor 110, and a plurality of second blast sensors 112A-112D. Although four second blast sensors are shown in FIG. 1 for illustration, the invention is not so limited. Selected examples include at least two second blast sensors 112, and a first blast sensor 110. The combination of physical positions of at least two second blast sensors 112 and the first blast sensor 110 define a plane (e.g., positions of surfaces of the sensors (e.g., outer surfaces), sensing elements, or one or more other common components, such as an opening, etc.). In one example, the first blast sensor 110 has a first power consumption metric when in operation, and the at least two second blast sensors 112 have a second power consumption metric lower than the first blast sensor 110. As discussed in more detail below, the at least two second blast sensors 112 have a lower data requirement, and as a result, can be made selected for lower power consumption.

FIG. 1 further shows a control circuit 120 configured to detect time differential data from the at least two second blast sensors 112 and detect blast severity data from the first blast sensor 110. A shockwave 104 is shown approaching the blast gauge system 100. In operation, time of sensing at multiple of the at least two second blast sensors 112 is recorded, and the data can be triangulated within the control circuit 120, or later downloaded and computed separately to determine information about direction and/or speed of the shockwave 104.

Capturing redundant, high fidelity BOP waveforms from all sensors to measure the source direction would rapidly increase power consumption by 3-4×, reducing device usage time between charging or battery replacement, or otherwise increasing power supply requirements as compared to the low-power blast gauge system and method described herein. The present inventors propose to leverage low power surrogate sensors to capture the incident direction. The surrogate sensor BOP data quality does not have to be high fidelity, it simply needs to respond to the relative arrival time of the shock front. Example surrogate sensors include pressure sensors, microphones, or force sensors, responsive to the incident shock front, and time-synchronized with the high-fidelity BOP sensor to measure precise relative arrival time at each location. This solution adds a robust, directionality feature (e.g., direction and speed, in certain examples a velocity vector) to the blast gauge system, while maintaining a long battery life and keeping overall cost low. In certain examples, the directionality feature can be used to adjust the detected high-fidelity BOP sensor measurement to correct recorded measurements with respect to orientation of the high-fidelity BOP sensor to the shock front and resulting overpressure.

As illustrated in FIG. 1, the angle of incidence in a plane can be derived from as few as three time-synchronized sensors, positioned at x,y=(0,0), (1,0), and (0,1) in relative units of distance, d. The hardware is designed to trigger and record the arrival time captured at each surrogate sensor, while collecting both a high-fidelity arrival time and full waveform BOP data from the third sensor. For calculation, d is relatively small in a wearable sensor (1" or less), the shock velocity is substantially constant, and the BOP shock front is essentially linear, as shown in FIG. 2. Let $t_0$, $t_1$, and $t_2$ correspond to time of arrival at the location of s0, s1, and s2, respectively. Since the velocity of the shockwave, $\vec{v}$, is assumed to be constant, this means that the differences in arrival time is proportional to the distance traversed, and the angle of incidence, Θ, can be calculated using Equation 1. Subsequently, the velocity magnitude can be determined using Equation 2.

$$\theta = \tan^{-1}\frac{t_2 - t_0}{t_1 - t_0} \tag{1}$$

$$|\vec{v}| = \sqrt{v_x^2 + v_y^2} = \sqrt{(d/(t_1 - t_0))^2 + (d/(t_2 - t_0))^2} \tag{2}$$

The addition of sensors s3 and s4 can improve the performance. Redundant sensors can improve the accuracy of velocity measurements and can mitigate risk of partial obstruction. This benefit can be weighed against the overall system requirements for size and power, which can be developed in collaboration with the customer.

In one example, the at least two second blast sensors 112 comprise microphones arranged in a grid, with sensors at x,y=(0,1), (1,0), (−1,0), and (0,−1), and the first blast sensor 110 can include a high-fidelity BOP sensor (e.g., BlackBox Biometrics® Blast Gauge® System, etc.) centered as the Blast Gauge BOP sensor. FIG. 2 illustrates angle of incidence determined using arrival time measurements after actuation with a starting pistol fired from specified angles from the center of the sensors, first calculated using 3 of the 5 sensors (s0, s1, and s2), as described in Equations 1-2, where d is 1". To demonstrate incidence angle's sensitivity to distance, the angles were calculated a second time using sensors s1, s2, s3, and s4, so that the parameter d is doubled, which improved accuracy. For d=1", the maximum error is 13 degrees, whereas for d=2", the error was limited to 2.2 degrees.

Figures 3, 4:
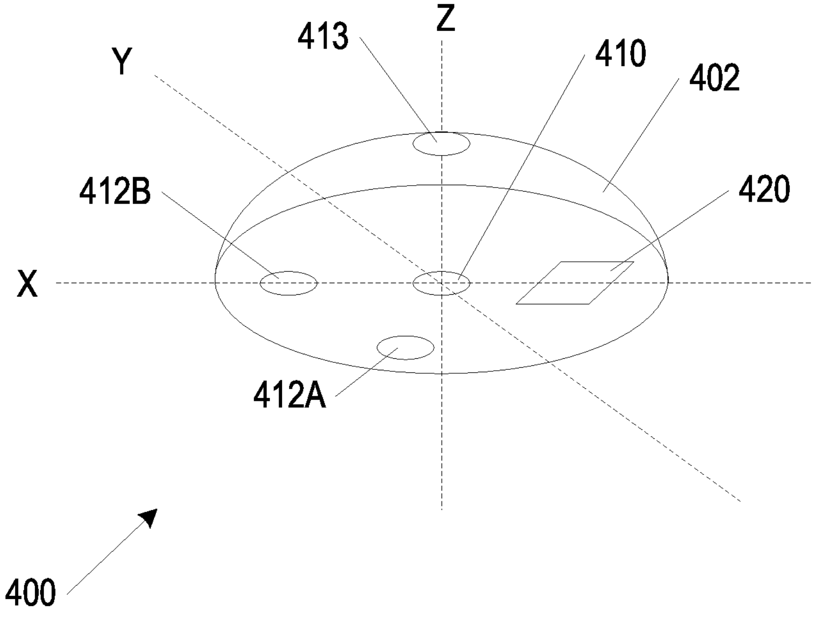
FIG. 3 illustrates additional blast gauge data according to selected examples.
FIG. 4 illustrates another blast gauge according to selected examples.

Angular Resolution:

In certain examples, the surrogate sensors can require temporal resolution to determine an angular resolution of the incident shock between 5-15 degrees from truth. FIG. 3 illustrates a relationship between sensor offset distance and required sample rate. In a wearable, it is desired to be as compact as possible while still achieving the goal of accurate BOP velocity measurement. Sensor offset distances between 0.5" and 1" require sensor sample rates between 1-13 MHz, which is feasible in a wearable gauge. Higher clock rates require more power. Keeping clock rates low while maintaining angular resolution can extend battery life.

In one example, the surrogate sensors (e.g., microphones) can be attenuated to capture impulse noise events. Although surrogate sensor data does not accurately capture a representative waveform for BOP events greater than 0.5 PSI, they do consistently respond to blast and have been shown to survive BOP peaks of greater than 60 PSI in testing.

Processing architecture to support enhanced wearable sensors with multiple unique sensors on board that supports timekeeping precision for the blast gauge system. Examples shown leverage faster FLASH memory and a more flexible real time operating system (RTOS) architecture that can allow the blast gauge system to multitask more effectively, offering more features for low power consumption. It enables an extended BOP data capture window of 100 ms, while also supporting back-to-back event capture every 100 ms, so there is no chance of missing peaks. The blast gauge system is built upon this architecture and maintain at least a 100 ms capture window.

In one example, gauge sensors as described are fully housed, operating on internal batteries, and fully capable of being evaluated in a field or simulated field environment. In one example, gauge sensors as described utilize Bluetooth wireless technology to reliably establish communications between the sensors and handheld user devices. In certain examples, if determined blast severity data for a single or multiple blasts exceeds a threshold, such as a safety threshold for a user, an alert or notification can be provided to the user or to one or more processes, such as using the blast gauge or one or more connected devices. In other examples, direction data can be provided to the user or one or more processes, such as if the determined bast severity data is above a threshold, such as an alert threshold. In one example, a PC application is also used that can alternatively provide a mechanism to manage gauges as well as collect and present any captured blast data.

In one example, a blast gauge and associated methods are extended to three dimensions by elevating one sensor in the z direction, located in the plane z=1, and deriving the orientation of the incoming shock front plane. This concept benefits from additional surrogate sensors to prevent issues to sensor obstruction for the incident wavefront.

FIG. 4 shows a diagram of a blast gauge 400. A housing 402 holds a first blast sensor 410 and at least two second blast sensors 412 (e.g., second blast sensors 412A and 412B, etc.). Although two are shown in FIG. 4 for illustration, other examples include more than two. Similar to the example of FIG. 1, the combination of the at least two second blast sensors 412 and the first blast sensor 410 define a first plane (the X-Y plane as illustrated in FIG. 4). In one example, the first blast sensor 410 has a first power consumption metric when in operation, and the at least two second blast sensors 412 have a second power consumption metric lower than the first blast sensor 410.

In an example, the housing 402 includes an outer surface, and an outer surface of the first blast sensor 410 and the second blast sensors 412A and 412B are at least partially coincident with or parallel to the outer surface of the housing 402. In certain examples, the outer surface of the first blast sensor 410 and the second blast sensors 412A and 412B define the first plane, in certain examples with a first surface (e.g., a first outer surface) of the housing 402 (e.g., a lower or bottom surface illustrated in FIG. 4, although the blast gauge 400 can be rotated or positioned in one or more other orientations or configurations such that the lower surface in FIG. 4 is not required to be a lower surface in operation). In other examples, a sensing element or one or more other common components or features (e.g., an opening in an outer surface, etc.) of the first blast sensor 410 and the second blast sensors 412A and 412B can define the first plane, at least partially or substantially coincident with or parallel to the first surface of the housing 402 or in other examples separate therefrom.

FIG. 4 includes a third blast sensor 413. The third blast sensor 413 is located outside the first plane (e.g., the X-Y plane illustrated in FIG. 4) and is located at some dimension along the Z-axis. In one example, the third blast sensor 413 has a third power consumption metric lower than the first blast sensor 410. In one example, the third blast sensor 413 is the same type of sensor as the at least two second blast sensors 412, and the second power consumption metric of the at least two second blast sensors 412 is the same as the third power consumption metric of the third blast sensor 413, although the invention is not so limited.

This configuration of FIG. 4 allows a direction and/or speed of a shockwave to be determined in three dimensions, as opposed to just two dimensions within the plane illustrated in FIG. 1.

FIG. 4 further shows a control circuit 420 configured to detect time differential data from the at least two second blast sensors 412 and the third blast sensor 413 and detect blast severity data from the first blast sensor 410. In operation, time of sensing at the at least two second blast sensors 412 and the third blast sensor 413 can be recorded, and the data can be triangulated within the control circuit 420, or later downloaded and computed separately to determine information about direction and/or speed of an incident shockwave.

In one example, addition of velocity vector information, such as determined direction and/or speed, can further improve the accuracy of FAST-CT, an algorithm designed to transform blast measured by 2-3 separate Blast Gauges into a single estimate of incident blast overpressure. The added data helps improve the accuracy of FAST-CT if the user chooses to employ this sensor as part of a 3-gauge set. It can also allow FAST-CT to be highly effective with fewer sensors worn on the body, in one example operating with a single sensor.

If sensors with a small amount of spacing are mounted on the body, FAST-CT provides incident blast metrics. If a subject is facing the blast the gauge would record a reflected overpressure value and if the subject is facing away the gauge would record a shielded value. A small amount of spacing between sensors overcomes this obstacle and provides more accurate estimates of the incident peak overpressure and other blast metrics.

Examples of blast gauges may consist of a relatively flat, conformal gauge positioned on the shoulder with user friendly PC, Android, and ATAK apps wirelessly collecting data and applying FAST-CT and other advanced algorithms, as well as automatically sending data to a customer-specified cloud.

Figure 5:
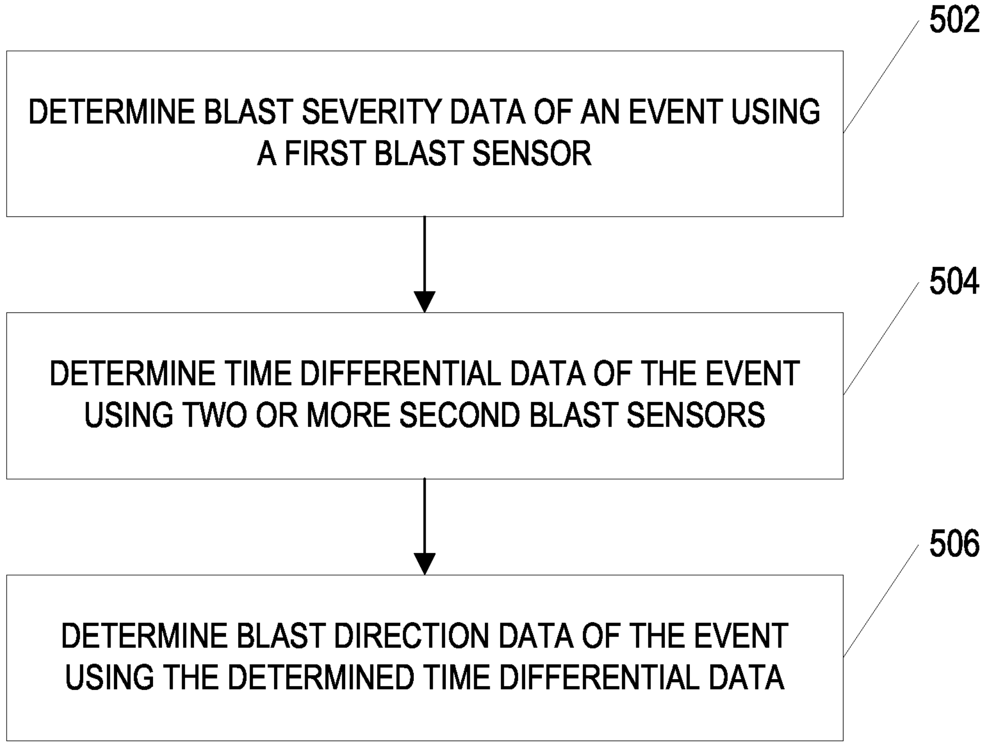
FIG. 5 illustrates a flow diagram of a method of blast detection according to selected examples.

FIG. 5 shows one example of a method of blast detection. In operation 502, blast severity data of an event can be determined using a first blast sensor having a first power consumption metric. In operation 504, time differential data associated with the event can be determined or detected using information two or more second blast sensors having a second power consumption metric lower than the first blast sensor. In operation 506, blast direction data can be determined of the event using the determined time differential data. As noted above, in one example, operation 506 is computed locally within a blast gauge. In one example, operation 506 is computed in a separate device, such as a computer, mobile phone app, etc.

Various embodiments are illustrated in the figures above. One or more features from one or more of these embodiments may be combined to form other embodiments. Method examples described herein can be machine or computer-implemented at least in part. Some examples may include a computer-readable medium or machine-readable medium encoded with instructions operable to configure an electronic device or system to perform methods as described in the above examples. In other examples, one or more wires can directly couple circuits to the sensing elements. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times.

Example 1 is a blast gauge, comprising: a plurality of blast sensors, including; a first blast sensor having a first power consumption metric when in operation; two or more second blast sensors having a second power consumption metric lower than the first power consumption metric, wherein positions of the first blast sensor and the two or more second blast sensors define a first plane; a control circuit configured to: measure a blast overpressure waveform of an event using the first blast sensor; and determine time differential data of the event using the two or more second blast sensors.

In Example 2, the subject matter of Example 1 includes, wherein the control circuit is configured to determine blast direction data of the event using the determined time differential data and the positions of the two or more blast sensors on the first plane, wherein the control circuit is configured to determine blast severity data of the event using the measured blast overpressure waveform of the event from the first blast sensor.

In Example 3, the subject matter of Example 2 includes, wherein the blast direction data includes blast velocity vector data, wherein the control circuit is configured to determine the blast severity data of the event using the measured blast overpressure waveform of the event from the first blast sensor and the determined blast velocity vector data.

In Example 4, the subject matter of Examples 2-3 includes, wherein the control circuit is configured to provide the determined blast severity data to a user or process if the determined blast severity data exceeds a threshold.

In Example 5, the subject matter of Examples 2-4 includes, wherein the control circuit is configured to determine time differential data using the first blast sensor and the two or more second blast sensors on the first plane, and wherein the control circuit is configured to determine the blast direction data using the determined time differential data and the positions of the first blast sensor and the two or more blast sensors on the first plane.

In Example 6, the subject matter of Examples 1-5 includes, wherein the blast gauge comprises a housing having a first surface substantially coincident with the first plane, wherein physical locations of the first blast sensor and the two or more second blast sensors on the first surface of the housing of the blast gauge define the first plane.

In Example 7, the subject matter of Examples 1-6 includes, wherein the first blast sensor and the two or more second blast sensors each have an outer surface, wherein positions of the outer surfaces of the first blast sensor and the two or more second blast sensors define the first plane.

In Example 8, the subject matter of Examples 1-7 includes, wherein the first blast sensor and the two or more second blast sensors each comprise a sensing element, wherein positions of the sensing elements of the first blast sensor and the two or more second blast sensors define the first plane.

In Example 9, the subject matter of Examples 1-8 includes, a third blast sensor having a third power consumption metric lower than the first blast sensor, wherein the third blast sensor is located outside the first plane.

In Example 10, the subject matter of Example 9 includes, wherein a housing of the blast gauge comprises a second surface, wherein a physical location of a surface of the third blast sensor is substantially coincident to at least a portion of the second surface.

In Example 11, the subject matter of Examples 1-10 includes, wherein the control circuit is configured to detect a pressure magnitude from the first blast sensor.

In Example 12, the subject matter of Examples 1-11 includes, wherein the control circuit is configured to determine a blast duration using the first blast sensor.

In Example 13, the subject matter of Examples 1-12 includes, wherein the two or more second blast sensors have a lower bandwidth capability than the first blast sensor.

In Example 14, the subject matter of Example 13 includes, wherein the first blast sensor comprises a high-fidelity blast overpressure sensor, and wherein the two or more second blast sensors include microphones, force sensors, or pressure sensors.

Example 15 is a method, comprising: measure a blast overpressure waveform of an event using a first blast sensor of a blast gauge having a first power consumption metric; and determining time differential data of the event using two or more second blast sensors of the blast gauge, the two or more second sensors each having a second power consumption metric lower than the first power consumption metric, wherein positions of the first blast sensor and the two or more second blast sensors define a first plane.

In Example 16, the subject matter of Example 15 includes, determining blast direction data of the event using the determined time differential data and the positions of the two or more blast sensors on the first plane; and determining blast severity data of the event using the measured blast overpressure waveform of the event from the first blast sensor.

In Example 17, the subject matter of Example 16 includes, wherein determining blast direction data comprises determining blast velocity vector data, wherein determining the blast severity data of the event comprises using the measured blast overpressure waveform of the event from the first blast sensor and the determined blast velocity vector data.

In Example 18, the subject matter of Examples 16-17 includes, providing the determined blast severity data to a user or process if the determined blast severity data exceeds a threshold.

In Example 19, the subject matter of Examples 16-18 includes, wherein determining time differential data comprises using the first blast sensor and the two or more second blast sensors on the first plane, and wherein determining blast direction data comprises using the determined time differential data and the positions of the first blast sensor and the two or more blast sensors on the first plane.

In Example 20, the subject matter of Examples 15-19 includes, wherein the blast gauge comprises a housing having a first surface substantially coincident with the first plane, wherein physical locations of the first blast sensor and the two or more second blast sensors on the first surface of the housing of the blast gauge define the first plane.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

These and other examples and features of the present infusion devices, and related methods will be set forth in part in the above detailed description. This overview is intended to provide non-limiting examples of the present subject matter—it is not intended to provide an exclusive or exhaustive explanation.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A blast gauge, comprising:

a plurality of blast sensors, including;

a first blast sensor having a first power consumption metric when in operation; and two or more second blast sensors having a second power consumption metric lower than the first power consumption metric, wherein positions of the first blast sensor and the two or more second blast sensors define a first plane; and a control circuit configured to:

measure a blast overpressure waveform of an event using the first blast sensor; and determine time differential data of the event using the two or more second blast sensors.

2. The blast gauge of claim 1, wherein the control circuit is configured to determine blast direction data of the event using the determined time differential data and the positions of the two or more blast sensors on the first plane, wherein the control circuit is configured to determine blast severity data of the event using the measured blast overpressure waveform of the event from the first blast sensor.

3. The blast gauge of claim 2, wherein the blast direction data includes blast velocity vector data, wherein the control circuit is configured to determine the blast severity data of the event using the measured blast overpressure waveform of the event from the first blast sensor and the determined blast velocity vector data.

4. The blast gauge of claim 2, wherein the control circuit is configured to provide the determined blast severity data to a user or process if the determined blast severity data exceeds a threshold.

5. The blast gauge of claim 2, wherein the control circuit is configured to determine time differential data using the first blast sensor and the two or more second blast sensors on the first plane, wherein the control circuit is configured to determine the blast direction data using the determined time differential data and the positions of the first blast sensor and the two or more blast sensors on the first plane.

6. The blast gauge of claim 1, wherein the blast gauge comprises a housing having a first surface substantially coincident with the first plane, wherein physical locations of the first blast sensor and the two or more second blast sensors on the first surface of the housing of the blast gauge define the first plane.

7. The blast gauge of claim 1, wherein the first blast sensor and the two or more second blast sensors each have an outer surface, wherein positions of the outer surfaces of the first blast sensor and the two or more second blast sensors define the first plane.

8. The blast gauge of claim 1, wherein the first blast sensor and the two or more second blast sensors each comprise a sensing element, wherein positions of the sensing elements of the first blast sensor and the two or more second blast sensors define the first plane.

9. The blast gauge of claim 1, including a third blast sensor having a third power consumption metric lower than the first blast sensor, wherein the third blast sensor is located outside the first plane.

10. The blast gauge of claim 9, wherein a housing of the blast gauge comprises a second surface, wherein a physical location of a surface of the third blast sensor is substantially coincident to at least a portion of the second surface.

11. The blast gauge of claim 1, wherein the control circuit is configured to detect a pressure magnitude from the first blast sensor.

12. The blast gauge of claim 1, wherein the control circuit is configured to determine a blast duration using the first blast sensor.

13. The blast gauge of claim 1, wherein the two or more second blast sensors have a lower bandwidth capability than the first blast sensor.

14. The blast gauge of claim 13, wherein the first blast sensor comprises a high-fidelity blast overpressure sensor, wherein the two or more second blast sensors include microphones, force sensors, or pressure sensors.

15. A method, comprising:

measure a blast overpressure waveform of an event using a first blast sensor of a blast gauge having a first power consumption metric; and determining time differential data of the event using two or more second blast sensors of the blast gauge, the two or more second sensors each having a second power consumption metric lower than the first power consumption metric, wherein positions of the first blast sensor and the two or more second blast sensors define a first plane.

16. The method of claim 15, comprising:

determining blast direction data of the event using the determined time differential data and the positions of the two or more blast sensors on the first plane; and determining blast severity data of the event using the measured blast overpressure waveform of the event from the first blast sensor.

17. The method of claim 16, wherein determining blast direction data comprises determining blast velocity vector data, wherein determining the blast severity data of the event comprises using the measured blast overpressure waveform of the event from the first blast sensor and the determined blast velocity vector data.

18. The method of claim 16, comprising:

providing the determined blast severity data to a user or process if the determined blast severity data exceeds a threshold.

19. The method of claim 16, wherein determining time differential data comprises using the first blast sensor and the two or more second blast sensors on the first plane, wherein determining blast direction data comprises using the determined time differential data and the positions of the first blast sensor and the two or more blast sensors on the first plane.

20. The method of claim 15, wherein the blast gauge comprises a housing having a first surface substantially coincident with the first plane, wherein physical locations of the first blast sensor and the two or more second blast sensors on the first surface of the housing of the blast gauge define the first plane.

* * * * *